United States Patent [19]
Gilblom et al.

[11] Patent Number: 5,650,813
[45] Date of Patent: Jul. 22, 1997

[54] PANORAMIC TIME DELAY AND INTEGRATION VIDEO CAMERA SYSTEM

[75] Inventors: David L. Gilblom; Peter S. Castro, both of Los Altos, Calif.

[73] Assignee: Picker International, Inc., Highland Heights, Ohio

[21] Appl. No.: 360,309

[22] Filed: Dec. 21, 1994

Related U.S. Application Data

[63] Continuation-in-part of Ser. No. 979,633, Nov. 20, 1992, abandoned.
[51] Int. Cl.[6] .................. H04N 7/18; H04N 5/232
[52] U.S. Cl. .................. 348/36; 348/295; 348/37
[58] Field of Search .................. 348/36, 37, 39, 348/295, 294, 143, 144, 146, 162, 164, 166, 167, 168; H04N 7/18, 5/232

[56] References Cited

U.S. PATENT DOCUMENTS

| 4,100,571 | 7/1978 | Dykes et al. | 348/37 |
| 4,896,211 | 1/1990 | Hunt et al. | 348/132 |
| 4,922,337 | 5/1990 | Hunt et al. | 348/88 |
| 4,949,172 | 8/1990 | Hunt et al. | 348/88 |
| 4,977,323 | 12/1990 | Jehle | 348/143 |
| 5,040,057 | 8/1991 | Gilblom et al. | 348/88 |
| 5,106,109 | 4/1992 | Gaylord | 348/9 |

FOREIGN PATENT DOCUMENTS

| 420289 A3 | 4/1991 | European Pat. Off. | H04N 5/232 |

OTHER PUBLICATIONS

"Signal Processing for Time Delay and Integrating Charge–Coupled Device (TDI–CCD) in the Panormaic Scan Mode," Sadowski, SPIE, vol. 282 Technical Issues in Focal Plane Development, (1981) pp. 115–128.

Primary Examiner—Howard W. Britton
Assistant Examiner—Vu Le
Attorney, Agent, or Firm—Fay, Sharpe, Beall, Fagan, Minnich & McKee

[57] ABSTRACT

One or more time delay and integration camera assemblies (A) are mounted in a housing (100) which is rotated by a motor (40, 106) relative to a vertical axis. A tachometer or encoder (44) produces signals whose frequency or voltage varies in accordance with an angular velocity of the camera assemblies about the vertical axis. A clock generator (46) converts the angular velocity signals into clocking signals for controlling movement of vertical lines of data values (20) along an array (14) of light sensitive elements to a shift register (22). In one embodiment, the clock generator includes a divider (82) which converts the angular velocity signal into a voltage, a comparator (84) which compares the first voltage with a second voltage, and a voltage controlled oscillator (88) which oscillates to generate the clocking signal. A second divider (88) defines a feedback loop between the output of the voltage controlled oscillator and the comparator for generating the second voltage. Each line of data from the array update (64) a corresponding line of a panoramic memory (66). The selectable portion (72) of the data from the panoramic memory is retrieved (70) independently of the memory updating. Scan converters (74) convert retrieved portions of the panoramic memory data into appropriate format for display on video monitor (78). In this manner, the panoramic memory is updated as the array rotates and data is independently retrieved from the panoramic memory to form panable displays.

25 Claims, 6 Drawing Sheets

PANORAMIC TIME DELAY AND INTEGRATION VIDEO CAMERA SYSTEM

This application is a continuation-in-part of U.S. application Ser. Ser. No. 07/979,633, filed Nov. 20, 1992 now abandoned.

BACKGROUND OF THE INVENTION

The present invention relates to the video arts. It finds particular application in conjunction with video periscopes and will be described with particular reference thereto. However, it is to be appreciated, that the invention will find application in conjunction with other panoramic, surveillance, and other wide angle video photography.

Periscopes, such as used in submarines, tanks, and the like, have traditionally been optical devices. Difficulties have arisen when several people needed to see the images viewed by the periscope at the same time or when the periscope images were to be permanently recorded. One technique for making permanent recordings was with a photographic camera. A camera, looking through the periscope, can only photograph the current field of view of the periscope. To view an entire 360° panorama, a series of photographs were taken which could later be connected into a panoramic image of the entire panorama.

Rather than using a photographic camera and the inherent delays for developing the film, similar results have been achieved with a conventional video camera. Using a conventional video camera, a series of frames of a video image were collected as the periscope was rotated. Each of these frames was analogous to a still photographic picture. At traditional video frame rates on the order of 30 frames per second, there was significant overlap among the images. Faster rotation or slower frame rates would cause blurring. Aligning and interconnecting the frame images was time-consuming and slow compared to a 30 frame per second acquisition rate. Differences from frame to frame causes discontinuities at the interfaces. Moreover, the apparent speed of rotation of the image when the camera is rotated parallel to its line sweep axis or direction varies across each image. That is, most periscopes rotate about a vertical axis to scan a horizontal horizon or parameter and most video cameras and video monitors have a horizontal sweep.

The present invention contemplates a new and improved panoramic video system which overcomes the above-referenced problems and others.

SUMMARY OF THE INVENTION

In accordance with one aspect of the present invention, a panoramic camera system includes a lens for focusing light from a field of view onto an array of light sensitive elements. A rotor rotates the field of view around an axis of rotation. A clock signal generator generates clocking signals in accordance with the rotation. A light sensitive array control shifts lines of data across lines of the light sensitive elements in coordination with the clocking signals. A panoramic memory stores the electronic image data which represents a 360° panoramic view around the axis of rotation. A memory updating means updates the panoramic memory in real time, with lines of data from the light sensitive array. A scan converter which is clocked independently of the clocking signals from the clock signal generator converts selectable portions of the electronic data from the panoramic memory into appropriate format for display on a video monitor with timing independent of the clocking signals.

In accordance with another aspect of the present invention, a lens focuses light from a field of view onto an array of light sensitive elements. A motor rotates the field of view about an axis of rotation. An encoder produces an encoder output signal which is proportional to an angular velocity with which the field of view is rotated. A phase-locked loop circuit converts the encoder output signal into a clocking signal whose frequency varies in accordance with the angular velocity. A time delay and integration control controls the light sensitive element array in accordance with the clocking signal such that the lines of electronic data are progressively shifted across lines of light sensitive elements. A memory stores the electronic data from the light sensitive array as an image representation. A scan converter converts at least a portion of the electronic image data from the memory into a video display format.

In accordance with a more limited aspect of the present invention, the encoder output signal has a frequency that is proportional to the angular velocity. The feedback loop includes a first divider that divides the frequency of an angular velocity by the focal length. A comparator compares the output of the first divider with an output from a second divider.

A voltage controlled oscillator generates a clocking signal which has a frequency in accordance with the comparison of the first and second divider outputs. The second divider divides the clocking signal by a number of lines per unit length on the CCD sensor.

In accordance with another aspect of the present invention, a panoramic camera system is provided. A lens focuses light from a field of view onto an array of light sensitive elements. The array of light sensitive elements is defined by a plurality of lines of light sensitive elements. A rotor rotates the lens and the light sensitive element together around an axis of rotation. The light sensitive array is controlled such that lines of data parallel to the axis of rotation are shifted from line to line in coordination with the rotation. A converter converts the lines of data from the light sensitive array into electronic image signals representative of columns of a panoramic view extending 360° around the axis of rotation. A panoramic memory stores electronic image data representative of the full 360° panoramic view. A memory update control updates the panoramic image stored in the panoramic memory in real time. A memory access control retrieves a selectable portion of the panoramic image data from the panoramic memory independent of the memory updating control. A scan converter converts the selectively retrieved portion into a video signal with timing independent of rotation of the lens. A video monitor converts the video signal into a human-readable display.

One advantage of the present invention is that it provides continuous, seam and discontinuity-free panoramic imaging.

Another advantage of the present invention is that multiple display devices can access the data concurrently to provide a plurality of different types of displays.

Another advantage of the present invention is that it reduces blurring in the resultant image.

Another advantage of the present invention is that it quickly adapts to different lenses, as well as to different image sensors.

Another advantage of the present invention is that it is readily adaptable to a wide range of image processing technique and display formats.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components and in various steps and

3 arrangements of steps. The drawings are only for purposes of illustrating the preferred embodiments and are not to be construed as limiting the invention.

DETAILED DESCRIPTION OF THE PREFERRED EMBODIMENTS

Figure 1:
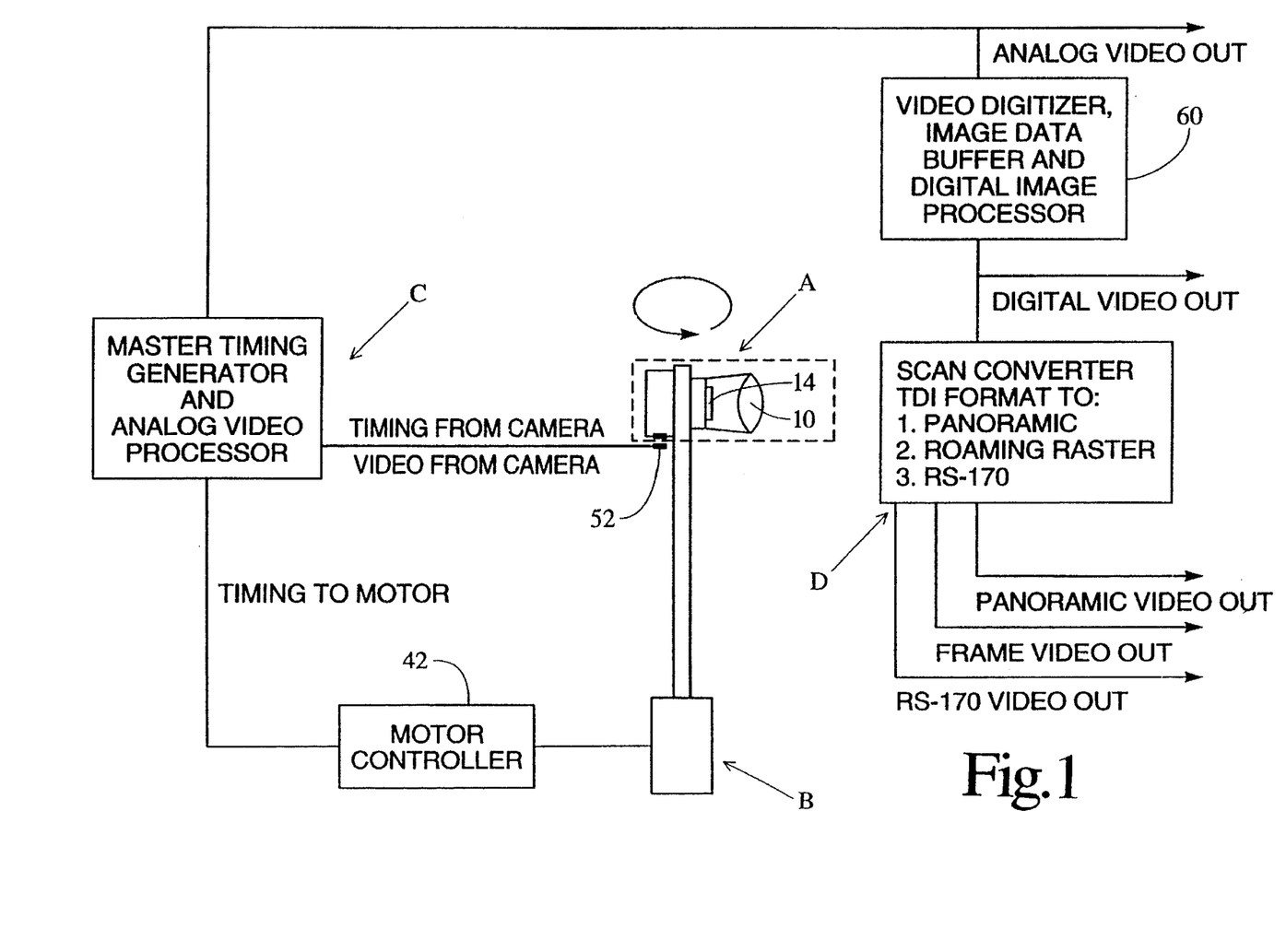
FIG. 1 is a diagrammatic illustration of a panoramic imaging system in accordance with the present invention.

With reference to FIG. 1, a time delay and integration (TDI) sensor means A converts light received from a field of view into a corresponding electronic signal. A sweeping or rotating means B rotates or sweeps the field of view along all or part of a 360° panoramic circle. A timing and control processor C coordinates the shifting of rows of data in the TDI sensor means with its rotation such that an output video signal represents a sweeping field of view without blurring. A digital processing and memory means D stores, processes, and displays all or a portion of the panoramic image.

Figure 2:
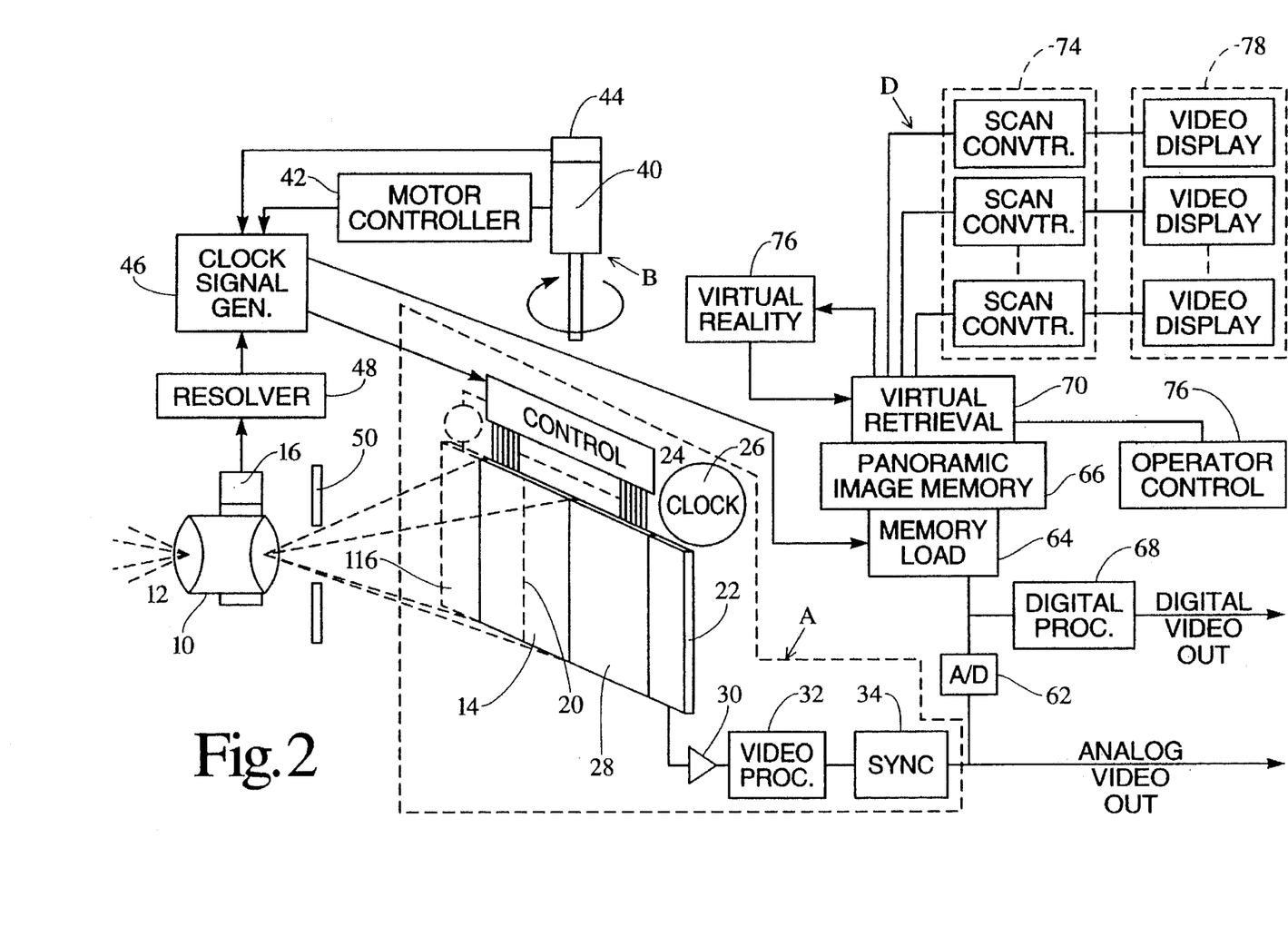
FIG. 2 is a detailed illustration of a variation on the TDI camera assembly of FIG. 1.
Figure 3:
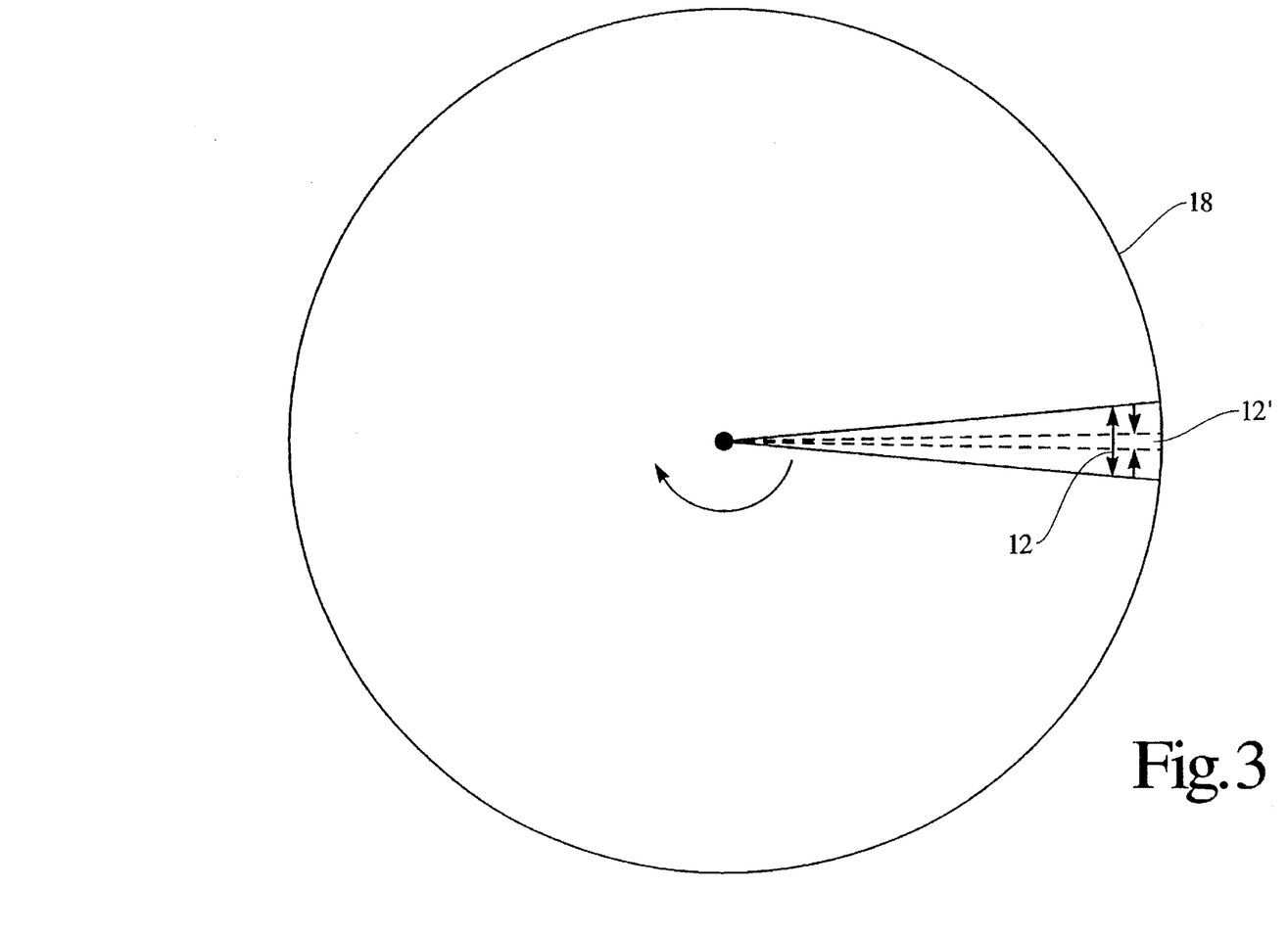
FIG. 3 is a diagrammatic illustration of the field of view scanned by the system of FIG. 1.

With continuing reference to FIG. 1 and further reference to FIGS. 2 and 3, a lens assembly 10 focuses light from a field of view 12 onto an image sensor 14. The image sensor 14 includes a plurality of CCD or other light sensitive elements arranged in a rectangular array. In one embodiment, the light sensitive array includes a standard RS-170 CCD array which has 244 lines or rows of light sensitive elements and 600 elements per line. For higher resolution, larger CCD sensor arrays are preferred. More specifically, the rows or lines are oriented vertically, parallel to an axis of rotation of the field of view. Because the array is rectangular, the elements within each line can be visualized as horizontal columns parallel to a plane within which the field of view is swept. The lens assembly 10 is preferably adjustable, such as a zoom lens. By selectively adjusting the magnification of the zoom lens with an electric zoom lens control motor 16, the field of view 12 is selectively widened or narrowed. For example, of a 360° circle 18 which surrounds the sensor assembly A, the lens might focus light or images from a 1° field of view on the sensor array 14. By selectively adjusting the zoom, the lens can "zoom in" on a smaller area 12', e.g. a 0.1° field of view.

Preferably, the image sensor 14 is a color sensor. That is, the sensor has three CCD elements for each pixel. Prisms, filters, or the like render each element corresponding to the same pixel sensitive to only one of red, green, or blue light, for an RGB monitor. Other triadic color schemes may, of course, also be used. As yet another option, additional CCD elements may be provided corresponding to each pixel. The additional elements may have a phosphor, or the like which is responsive to other wavelengths of radiation, such as ultraviolet or infrared. In this manner, color, infrared, and UV images can be acquired concurrently.

As the sweeping means B sweeps or rotates the field of view along the panoramic circle 18, a vertical line of the available light, e.g. a distant, stationary flagpole, has its image focused on one line of the sensor elements, e.g. line 20. As the sweeping means rotates the TDI sensor means A with respect to the flagpole, the vertical line or flagpole moves along the sensor array 14. In a CCD type array, the charge on each element is accumulated in proportion to the amount of light received. To read the data on the array, the charge values are shifted line by line toward a shift register 22.

A control means 24 controls the shifting of the rows along the sensor array 14. In particular, the control means 24 clocks the array 14 such that the line of charged values is shifted along the array 14 at the same speed that the vertical line of data or flagpole sweeps along the array 14. The amount of charge dissipated by the image of the vertical line of light or flagpole continues over each of the lines of light sensitive elements. In the preferred 244 line embodiment, the image of the vertical line of light or the flagpole is integrated or summed 244 times. The shift register 22 serializes each line of charge values. In particular, a fast clock 26 clocks the shift register 22 600 times, or as many horizontal columns of array elements as may be present in the selected light sensitive array, in between each time the charge values are shifted by one vertical line. In this manner, the output of the shift register is a multiplicity of vertical lines of video data which taken together, represent a continuous image. There is no inherent frame end.

It might be helpful to note that a traditional interlaced video camera has a light sensitive array which, as a whole, receives light for a preselected duration, e.g. 1/60th second. When the integration is completed, the shutter is closed and a control means performs 244 shift operations on lines of video data to shift the entire field as rapidly as possible into a CCD storage array or section 28. The storage section is shielded from light by the closed shutter. As soon as all 244 lines of data are shifted into the storage section, the light sensitive array of CCD elements 14 starts the collection of light for a second frame. During the 1/60th second that light is collected for the second field, a shift register serializes the 600 charge values of each of the 244 lines of video data into a video output signal. Thus, a traditional video camera is a batch processor which produces a series of 244 lines ×600 pixels as a frame in each batch; whereas, the TDI sensor is a continuous processor which produces a continuous image. Preferably, the control means 24 is also controllable to operate the TDI sensor A as a conventional video camera, particularly when there is no rotation. In this manner, detailed images of a region of interest can be made. When operating in the TDI mode, the storage section merely causes a 244 line delay before the lines reach the shift register.

Suitable TDI imaging means for use in the present invention are found in U.S. Pat. Nos. 5,040,057; 4,949,172; and 4,922,337; the disclosures of which are incorporated herein by reference.

The output of the shift register 22 is conveyed to an amplifier 30 which amplifies the analog output of the shift register. A video processing channel 32 further processes the video signal with a bandpass filter for removing any vestiges of the clock signal noise, a gain amplifier, a clamping means for restoring DC video, and the like. A synchronization means 34 adds a "horizontal" blanking signal to denote the end of each vertical line of data. In the TDI mode, no frame or vertical retrace synchronization signals are added. In this manner, an output video signal is generated on a continuum. By way of specific example, when the field of view is 1° and the array of sensor elements has 244 lines, then each 360° rotation of the TDI imaging means produces an image which has (360°/rev.)×(244 lines/°) or about 88,000 vertical lines/ revolution, each line having 600 pixel values. That is, a resultant 360° panoramic image with a 1° field of view would be an image with 88,000×600 pixel values. Analogously, a lens with a 1/10° field of view produces a panoramic image with 880,000×600 pixel values.

The sweeping means B includes a motor 40, preferably a synchronous motor, operated by a motor controller 42. A tachometer or encoder 44 produces a timing signal having a frequency which is proportional to the current angular velocity or rotational speed of the motor and the imaging means A. Alternately, with a synchronous motor, the signals from the motor controller 42 also provide an output signal whose frequency is proportional to rotational speed. A clocking signal generator or means 46 produces clocking signals which cause the control means 24 to clock the lines of charge along the light sensitive array 14 in coordination with the rotation. In the preferred embodiment, the frequency of the output signal is higher than the frequency with which the control means 24 steps lines of charge along the light sensitive array. The clocking means 46 divides the tachometer or encoder signal by a divisor which is appropriate to the focal length of the camera, the size of the light sensitive array 14, and other aspects of system geometry to generate the clocking signal. A field of view indicating means 48, such as a resolver connected with the zoom lens motor 14, produces an output signal which adjusts the divisor with lens adjustment. Analogously, where interchangeable lenses are provided, each lens is preferably encoded with its focal length and the resolver 48 includes circuitry for reading the encoding and outputting the corresponding divisor. By way of brief example, if the field of view is initially 1° of the 360° of rotation, then the clocking signal would cause each vertical line of charge values to be shifted with every 1/244th° of rotation. If the zoom lens zooms from the 1° field of view to a 1/10th° field of view, the clocking signal would be increased by a factor of 10, i.e., the divisor decreased. In this manner, at the 1/10th° field of view, a clock signal is produced after each 1/244th° of rotation.

It will be noted that the amount of light integrated to make each pixel is dependent upon the rotational speed of the imaging means A. Preferably, the rotational speed of the imaging means is adjusted to control the exposure. That is, the rotational speed is accelerated or slowed until a proper exposure is achieved. Of course, changing the rotation speed changes the clock speed as described above. This enables the rate at which image data is acquired to be maximized for available lighting conditions. Alternately, it may be appropriate to slow the speed of rotation. An iris 50 is provided for selectively limiting the amount of light received by the light sensitive array 14 to optimize exposure.

With continuing reference to FIG. 1, a set of slip rings 52 enable the video signal to be removed from the rotating TDI camera means A and enable the timing and control signals to be introduced into the imaging means A. The slip rings can carry the clocking signals and the signals from the shift register as in FIG. 1. Alternately, the analog video processing circuits and the clocking and control circuits can be mounted adjacent to the image sensor 14 for rotation therewith. The analog video output signals may be connected directly with a suitable display. Preferably, however, the video signals are conveyed to a digital video section 60. The digital video section includes an analog-to-digital converter 62 and a memory loading means 64 for storing the digital data or pixel values in a panoramic image memory 66. The memory loading means receives angular position signals from the tachometer to coordinate corresponding lines of data in subsequent revolutions. In the above example in which the field of view is 0.1° and the sensor array is 244×600, the panoramic image memory stores an 88,000× 600 array of pixel values. Each of the pixel or data values has a gray scale of 8, 10, 12, or more bits. A digital video processor 68 converts the digital pixel values or data to a digital video signal. The digital video signal may be appropriately displayed on a digital video monitor as a sampled or scrolling image, or the like. A scan conversion facility in the image processor provides a video output signal compatible with conventional video monitors.

Figure 4:
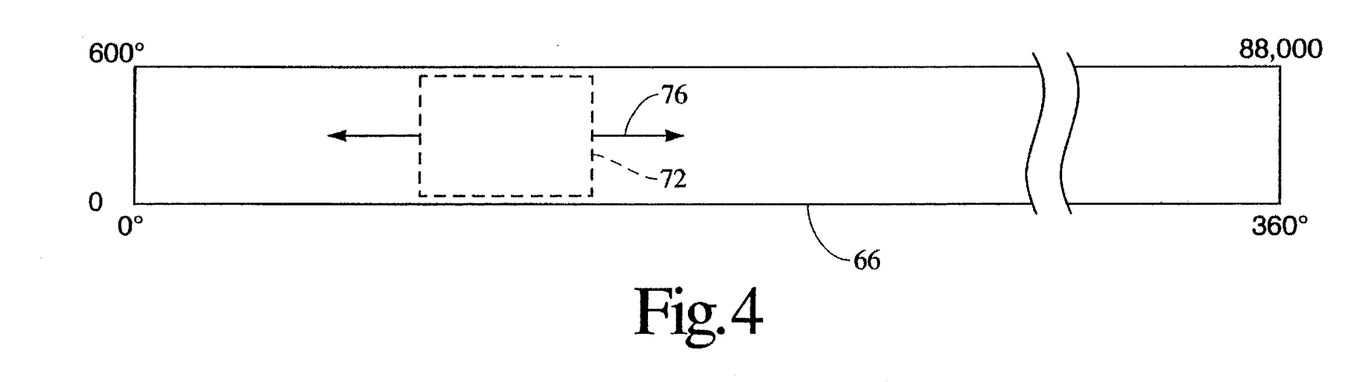
FIG. 4 illustrates selective adjustment of the portion of a panoramic image displayed through a view port.

With reference to FIGS. 1 and 4, a memory retrieval access means 70 selectively retrieves blocks 72 of data from the panoramic memory 66. Referring again to the above example in which the panoramic memory 66 stores data corresponding to 88,000 lines, each line 600 pixels high, the stored data can be conceptualized as a long picture 88,000 lines long. The picture represents the image viewed by the TDI camera during 360° of rotation. Thus, the column of pixels at 0° and 360° are the same. The retrieved data blocks 72, such as 480×600 pixel blocks, are retrieved by the memory retrieval means 70 and conveyed to a scan converter 74. An operator control 76 is connected with the memory retrieval for selectively sliding the retrieved block or viewing port 72 along the panoramic image representation in the panoramic memory 66. The scan converter 74 generates an appropriate video signal for display on one or more video monitors. Various format video signals are contemplated including digital video, panoramic video, frame video, RS-170 video, and the like.

An array of video monitors 78 may be grouped such that one of the video monitors shows the image in a preselected block or view port to the east, another shows the image in a preselected view port to the west, another to the northeast, etc. This enables a viewing room to be surrounded by video monitors which provide a substantially real time panoramic display of the surroundings. Alternately, the operator can have a single monitor and selected portion of the panoramic image displayed with the control 76. The scan converter may enlarge or reduce the displayed image. That is, rather than displaying the entire block or view port, the scan processor can extrapolate the actually stored pixel values into additional pixel values such that a fraction of the image held in a given view port is displayed full screen, i.e., enlarged. Analogously, the scan converter can combine, e.g., average, pixel values from a region of the panoramic memory larger than a 480×600 view port to provide a wider scale panoramic view.

An appropriate indicator, such as a vertical white line, may be provided to show the demarcation between the most recently received data and the data which was received almost a full revolution ago. As another option, a virtual reality means 80, including virtual image display goggles, may retrieve an appropriate block of pixel values from the memory 66. The virtual reality means 80 includes means for indicating the direction which the viewer is facing and looking. These direction signals are used to control the memory retrieval means 70 to retrieve the blocks of pixel values representing the image in the direction the viewer is looking. One or more VCR's may be connected with the scan converter for recording the images.

Figure 5:
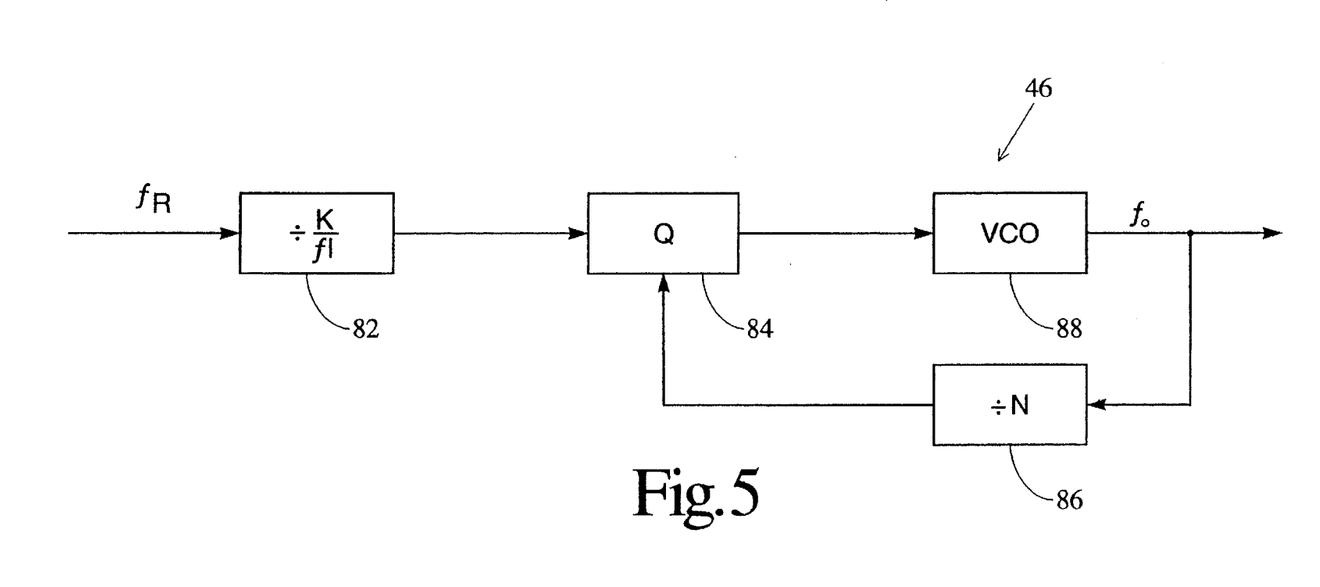
FIG. 5 is a diagrammatic illustration of the clock signal generator of FIG. 2.

With reference to FIG. 5, the clock control 46 is a fractional phase-lock loop which reduces pulses from the encoder or asynchronous motor controller with a frequency $f_R$ indicative of the rate of rotation into signals of the appropriate clocking frequency $f_O$ for the CCD array control 24. More specifically to the preferred embodiment, a divider 82 divides the angular velocity as indicated by $f_R$ by the inverse of the focal length fl of the lens. A comparator or error circuit 84 compares the output of the divider 82 with the output of a divider 86 and adjusts an oscillator 88 in accordance with the difference therebetween. The voltage controlled oscillator outputs the clocking frequency $f_O$ for the CCD sensor. The output frequency $f_O$ is supplied to the divider 86 which divides the output frequency by a number of lines N per unit length on the selected CCD sensor. In the preferred embodiment, the outputs of the dividers 82 and 86 are voltages, which voltages are compared by the comparing circuit 84, and the oscillator 88 is a voltage controlled oscillator. The resolver 48 is connected with the divider 82 for adjusting the divisor in accordance with the focal length of the selected lens or position of the zoom lens.

Looking to theory behind the clock controller 44, the image sensor 14 has N lines per unit length. The image sensor is rotating at an angular velocity $\omega$ radian/second. At a distance r from the sensor, the projection of the lines is moving at a velocity v:

$$v = r \times \omega \qquad (1).$$

The frequency $f_O$ at which the sensor lines are pulsed is defined by:

$$f_O = v \times P = r \times \omega \times P \qquad (2),$$

where P is a projection of the lines N at the distance r. The lens equation for magnification defines the projection as:

$$P = (fl/r) \times N \qquad (3),$$

where fl is the focal length of the lens. Thus, the clocking frequency $f_O$ is independent of the distance r:

$$f_O = r \times \omega \times (fl/r) \times N = \omega \times fl \times N \qquad (4).$$

In this manner, the sensor is synchronized for all distances. Typically, the output of the tachometer or encoder is at a higher frequency than the angular velocity $\omega$, i.e.:

$$f_R = K\omega \qquad (5),$$

where K is a constant that relates the angular velocity and frequency for the particular tachometer selected. Thus, the tachometer frequency $f_R$ and the sensor clocking frequency $f_O$ are related by:

$$\frac{f_O}{N} = \left(\frac{fl}{K}\right) \times f_R. \qquad (6)$$

Thus, the clocking frequency for achieving synchronism is scaled by 1/fl, i.e., the reciprocal of the focal lengths of the lens. By using a variable focal length (zoom) lens at a given clocking frequency, synchronism can be achieved by changing the focal length of the lens.

Figure 6:
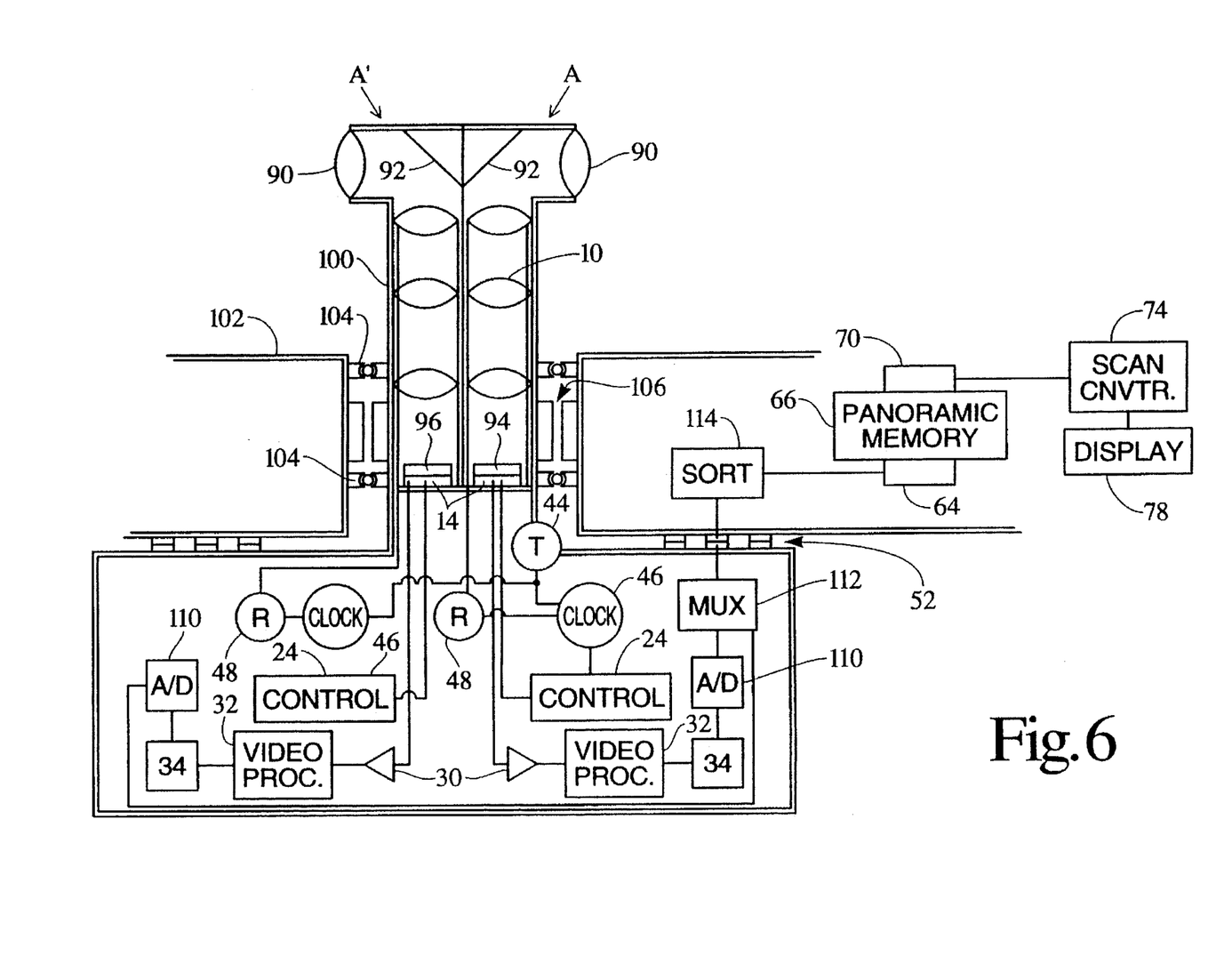
FIG. 6 is an alternate embodiment of the system of FIG. 1.

With reference to FIG. 6, a plurality of image sensors 14, each receiving a different field of view, spectrum, or the like, are mounted to rotate together. For example, two camera or image sensors mounted 180° apart enables the panoramic memory 66 to be updated twice as often. Alternately, the timing and control signals may be such that the output lines are interlaced to improve resolution. For example, one of the cameras may acquire odd-numbered vertical columns of the panoramic image and the other may acquire even-numbered vertical columns. As yet another option, the two cameras may be vertically offset to double the vertical field of view. As yet another option, the two cameras effective viewing position can be offset horizontally for stereoscopic imaging.

As another example, an image intensifier may be disposed between the lens and the light sensitive element array 14 to increase light sensitivity.

One of the image sensing means A includes a lens 90 which detects light to a mirror 92 and the zoom lens 10. A prism means 94 separates the light into three color components focused on each of three respective light sensitive elements of the array 14 for each pixel. Shift registers serialize the data which is then supplied to the panoramic memory 66.

A second image sensing means A' again has a zoom or other lens system 10 which focuses light on a phosphor 96. The phosphor 96 converts light of a preselected wavelength into light of an optimal wavelength for the array of light sensing element array 14. Optionally, a sensor may be used in which a material sensitive to non-visible light is placed on a silicon sensor and provide signals directly to the sensor as a result of receiving the non-visible light. For example, platinum silicide or pyroelectric materials may be used to sense infrared light. In a preferred embodiment the phosphor 96 may be an ultraviolet conversion phosphor, an infrared conversion phosphor, or phosphors which convert energy of other wavelengths into appropriate optical light for the sensor array 14.

In the embodiment of FIG. 1, the motor 40 rotates a shaft which rotates the TDI imaging means A. In the embodiment of FIG. 6, the imaging means are mounted in a housing 100 which is mounted to a stationary structure 102 by one or more bearings 104 and a motor assembly 106. The tachometer 44 is mounted in conjunction with the motor 106. With this arrangement, all of the control signals can be generated within the housing 100. The slip ring bearing arrangement 52 carries the output video signal, input controls for the zoom lens motor 16, controls for the iris 50, and for the motor 106. Input control signals can also shift the control means 24 between the time delay and integration mode and a conventional video imaging mode.

The output of each image processing channel 32 and synchronization means 34 is conveyed to an analog-to-digital converter 110. A multiplexing means 112 multiplexes the digital video signals. A demultiplexing or other sorting means 114 sorts the multiplexed digital values into an appropriate panoramic memory or memory portion.

Although the lens assembly 10 is illustrated as a zoom lens, other lenses are also contemplated. For example, a lens or mirror 92 can be movable to shift the field of view. Alternately, multiple lenses may be interchangeable, i.e. selectively moved into the optical path to change the optical properties. As yet another option, an anamorphic lens is used to alter the height to width ratio of the field of view. This alters the ratio of the coverage between the height of the image and the scan speed.

With reference again to FIG. 2, in another alternate embodiment, the motor 40 can rotate the camera in either direction. When the camera changes direction, the polarity of the clock signals changes. More precisely, a reverse direction signal is provided to the control means 24 such that the control means shifts the charge values in the opposite direction along the rows at the designated clock speed. To this end, a second shift register 22' is provided at the other end of the light sensitive array 14. Because only one of the shift registers 22 and 22' would be used at a time, their outputs use the same output circuitry.

As yet another alternate embodiment, the shaft 100 is gimbaled or the like to compensate for tilt or rotational motion such as is found on an aircraft or other unstable platforms.

Figure 7:
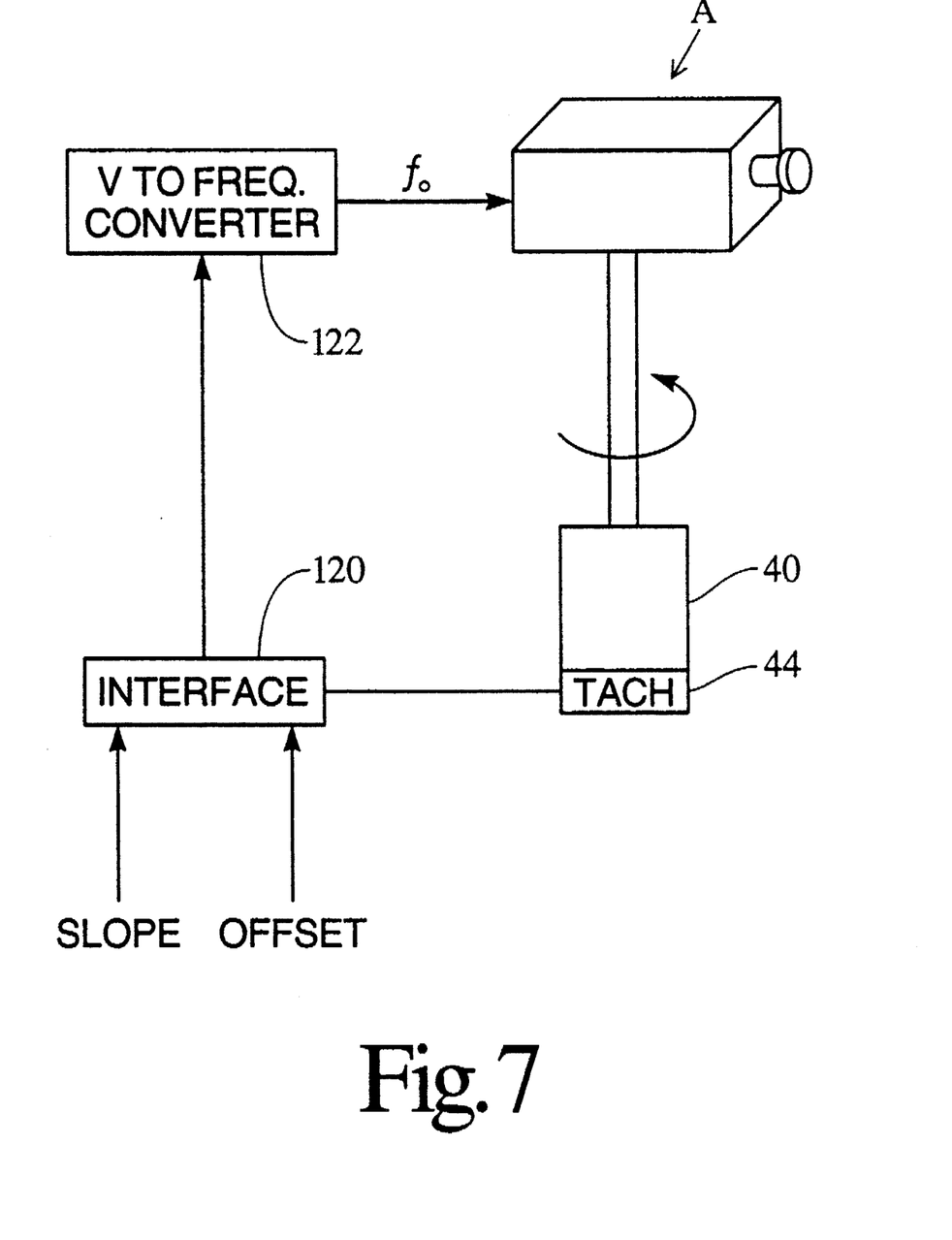
FIG. 7 illustrates an alternate clock signal generator.

With reference to FIG. 7, in an alternative clocking generator 46 for generating the sensor control or clocking signal $f_0$, the tachometer 44 generates an angular velocity signal which is a voltage that is proportional to angular velocity. An interface circuit 120 adjusts the angular velocity signal voltage with offset and slope adjustments. The output voltage from the interface circuit is conveyed to a voltage-to-frequency converter 122 which converts the voltage into the control or clocking frequency $f_O$ for the sensor control 24. The slope adjustment input receives the signal which is proportional to Nfl/K to adjust the frequency $f_O$ in accordance with changes in the lens focal length or changes in the sensor.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A panoramic camera system including a lens for focusing light from a field of view onto an array of light sensitive elements, the array of light sensitive elements being defined by a plurality of lines of light sensitive elements, a rotor for rotating the lens and the light sensitive element array together about an axis of rotation, the array of light sensitive elements being mounted in a plane parallel to the axis of rotation, a control for controlling the light sensitive element array such that lines of data are shifted from each line of light sensitive elements to an adjacent line of light sensitive elements along the light sensitive element array in coordination with rotation of the lens and the light sensitive array about the axis of rotation, a converter for converting the lines of data from the light sensitive element array into electronic image signals representative of columns of a panoramic view, the system further including:

a panoramic memory for storing electronic image data representative of a multiplicity of the columns which span a full 360° around the axis of rotation;

a memory updating control for updating the electronic image data stored in the panoramic memory in real time with each electronic image signal representative of one column of the panoramic view such that the panoramic memory stores only the most recent data corresponding to each position along the entire 360° panoramic view;

a memory access control for retrieving independent of the memory updating control an arbitrarily selectable fraction of the electronic image data from the panoramic memory which selectable fraction of the electronic image data represents a selectable viewing window which is a fraction of the panoramic view;

a scan converter for converting the selectively retrieved row segments of the electronic image data into a video signal with timing independent of rotation of the lens;

a video monitor for converting the video signal from the scan converter into a human-readable display.

2. A panoramic camera system comprising:

a lens for focusing light from a field of view onto an array of light sensitive elements, the array of light sensitive elements being defined by a plurality of lines of light sensitive elements;

a rotor for rotating the field of view about an axis of rotation such that the field of view rotates through 360° around the axis of rotation;

a clocking signal generator for generating clocking signals in accordance with the rotating of the field of view about the axis of rotation;

a control for controlling the light sensitive array such that lines of data are shifted across the lines of light sensitive elements in the array from line to line toward an end line of light sensitive elements in coordination with the clocking signals from the clocking signal generator;

a panoramic video memory for storing electronic image data representative of a 360° panoramic view around the axis of rotation;

a memory updating means for updating the panoramic memory in real time with the lines of data from the light sensitive array, each line of data overlaying a previous data line corresponding to a common angular orientation within the 360° panoramic view;

a data retrieval means for retrieving a selectable portion of the electronic image data stored in the panoramic video memory;

a scan converter clocked independently of the clocking signals from the clocking signal generator for converting the selected selectable portion of the electronic image data retrieved from the panoramic memory into appropriate format for display on a video monitor with timing independent of said clocking signals;

an operator adjustable control for controlling the data retrieval means for sweeping the selected portion of the electronic image data to be retrieved independent of rotation of the field of view, whereby the operator selectively sweeps the video monitor display along the 360° panoramic view independent of movement of the rotor.

3. The panoramic camera system as set forth in claim 2 wherein the clocking signal generator receives signals having a frequency indicative of an angular velocity with which the field of view is rotating around the axis of rotation, the clocking signal generator including:

a frequency-to-voltage converter for converting the angular velocity of rotation signal frequency into a voltage signal; and a voltage controlled oscillator controlled by the signal from the frequency-to-voltage converter for generating the clocking signal.

4. The panoramic camera system as set forth in claim 3 wherein the frequency-to-voltage converter voltage signal is proportional to the input frequency in accordance with an adjustable constant and further including:

a means for adjusting the adjustable constant in accordance with changes in a focal length of the lens.

5. The panoramic camera system as set forth in claim 3 wherein the clocking signal generator further includes:

a phase-lock loop control connected with the voltage controlled oscillator.

6. The panoramic camera system as set forth in claim 3 further including:

a field of view adjusting means for selectively adjusting a focal length of the lens, the field of view adjusting means being connected with the frequency-to-voltage converter for adjusting its output voltage in accordance with changes in the focal length of the lens.

7. The panoramic camera system as set forth in claim 2 further including:

a tachometer connected with the rotor for producing an output voltage signal which is proportional to an angular velocity with which the field of view is rotated and wherein the clocking signal generator includes:

a voltage-to-frequency converter for converting output voltages from the tachometer into the clocking signals such that the clocking signals vary in accordance with variations in the rotating of the field of view about the axis of rotation.

8. The panoramic camera system as set forth in claim 2 wherein the panoramic memory is a digital memory and further including:
  a video processing circuit for processing the lines of data from the light sensitive element array into analog video signals;
  an analog-to-digital converter for converting the analog video signals into digital video signals for storage in the digital panoramic memory.

9. A camera system comprising:
  a lens for focusing light from a field of view onto an array of light sensitive elements, the array of light sensitive elements being defined by a plurality of parallel lines of light sensitive elements;
  a motor for rotating the field of view about an axis of rotation such that the light focused by the lens is swept across the array of light sensitive elements in a direction orthogonal to the lines of light sensitive elements;
  an encoder for producing an encoder output signal which is proportional to an angular velocity with which the field of view is rotating about the axis of rotation;
  a phase-locked loop for converting the encoder output signal into a clocking signal whose frequency varies in accordance with the angular velocity with which the field of view about the axis of rotation;
  a time delay and integration control for controlling the light sensitive element array such that the lines of electronic data are progressively shifted across the lines of light sensitive elements in accordance with the clocking signal;
  a memory for storing the electronic data from the light sensitive array which represents only most recently collected data at each position within the field of view;
  a data retrieval means for retrieving an operator selectable portion of the electronic image data from the memory, the data retrieval means being clocked independently of the clocking signal;
  a scan converter for converting the retrieved portion of the electronic image data from the panoramic memory into a video display format.

10. The camera system as set forth in claim 9 wherein the encoder output signal has a frequency that is proportional to the angular velocity and the phase-locked loop includes:
  a comparator for comparing the encoder output signal with the clocking signal;
  a voltage controlled oscillator connected with the comparator for generating the clocking signals, the clocking signal having a frequency in accordance with the comparison;
  at least one divider for dividing at least one of the encoder output signal and the clocking signal by an adjustable constant before the divided signal is provided to the computer.

11. The camera system as set forth in claim 10 wherein the lens has an adjustable focal length and further including:
  a means for adjusting a proportionality of at least one of the frequency-to-voltage converters in accordance with changes in the focal length of the lens.

12. The camera system as set forth in claim 9 further including:
  an operator controlled means for selectively adjusting the portion of the electronic data retrieved by the data retrieval means.

13. A camera system comprising:
  a lens for focusing light from a field of view onto an array of light sensitive elements, the array of light sensitive elements being defined by a plurality of parallel lines of light sensitive elements;
  a motor for rotating the field of view about an axis of rotation such that the light focused by the lens is swept across the array of light sensitive elements in a direction orthogonal to the lines of light sensitive elements;
  an encoder for producing an encoder output signal which is proportional to an angular velocity with which the field of view is rotating about the axis of rotation;
  a phase-locked loop for converting the encoder output signal into a clocking signal whose frequency varies in accordance with the angular velocity with which the field of view about the axis of rotation;
  a field of view adjusting means for selectively changing a focal length of the lens;
  an adjusting means operatively connected with the phase-locked loop for altering a frequency of the clocking signals in accordance with changes in the focal length of the lens;
  a time delay and integration control for controlling the light sensitive element array such that the lines of electronic data are progressively shifted across the lines of light sensitive elements in accordance with the clocking signal;
  a memory for storing the electronic data from the light sensitive array as an image representation of a view around the axis of rotation;
  a scan converter for converting at least a portion of the electronic image data from the panoramic memory into a video display format.

14. A camera system comprising:
  a lens for focusing light from a field of view onto an array of light sensitive elements, the array of light sensitive elements being defined by a plurality of parallel lines of light sensitive elements;
  a motor for rotating the field of view about an axis of rotation such that the light focused by the lens is swept across the array of light sensitive elements in a direction orthogonal to the lines of light sensitive elements;
  an encoder for producing an encoder output signal which is proportional to an angular velocity with which the field of view is rotating about the axis of rotation;
  a phase-locked loop for converting the encoder output signal into a clocking signal whose frequency varies in accordance with the angular velocity with which the field of view about the axis of rotation;
  a time delay and integration control for controlling the light sensitive element array such that the lines of electronic data are progressively shifted across the lines of light sensitive elements in accordance with the clocking signal;
  a memory for storing the electronic data from the light sensitive array as an image representation of a view around the axis of rotation;
  a plurality of scan converters for independently converting individually selectable portions of the electronic data stored in the panoramic memory into appropriate format for concurrent display on each of a plurality of video monitors.

15. The camera system as set forth in claim 9 further including a spectra means disposed between the lens and a fraction of the light sensitive elements of the light sensitive element array for converting light of a preselected non-visible wavelength spectrum into light of a wavelength spectrum to which the light sensitive elements of the light sensitive element array are sensitive.

16. A panoramic camera system comprising:

a first lens for focusing light from a first field of view onto a first light sensitive element array;

a second lens for focusing light from a second field of view on a second light sensitive element array;

a sweeping means for sweeping the first and second fields of view to view in directions spanning 360° about an axis of rotation;

a first clock for clocking the first light sensitive element array such that lines of data are shifted along the first light sensitive element array in coordination with sweeping about the axis of rotation;

a second clock for clocking the second light sensitive element array such that lines of data are shifted along the second light sensitive element array in coordination with the sweeping about the axis of rotation;

a memory means for storing the electronic data representing at least a first panoramic view extending a full 360° around the axis of rotation;

a first memory updating means connected with the first light sensitive element array for selectively updating lines of the electronic data stored in the memory means with the lines of data from the first light sensitive element array;

a second memory updating means connected with the second light sensitive element array for selectively updating lines of the electronic data stored in the memory means with the lines of data from the second light sensitive element array.

17. The camera system as set forth in claim 16 further including video processing means for converting the lines of data from the first and second light sensitive element arrays into analog video signals.

18. The camera system as set forth in claim 16 further including a spectrum means disposed between the second lens means and the second light sensitive element array for converting light of a preselected spectrum into light of a wavelength to which the second light sensitive element array is sensitive.

19. The camera system as set forth in claim 18 wherein the spectrum means includes a photovoltaic coating for converting infrared light to electrons which are accumulated by the second light sensitive array is receptive.

20. The camera system as set forth in claim 16 further including:

a data retrieval means for retrieving a selectable frame of electronic data from the memory means, the data retrieval means being clocked independently of the first and second clock signals;

a video processing means for converting frames of electronic data from the memory means into appropriate format for display on a monitor.

21. The camera system as set forth in claim 16 further including:

an angular velocity sensor for producing an output signal that varies in accordance with an angular velocity with which the first and second fields of view sweep around the axis of rotation;

at least one of the first and second clocks including a voltage controlled oscillator for generating clocking signals, the voltage controlled oscillator being connected with the angular velocity sensor for receiving the output signal therefrom such that the clocking signal varies in accordance with the angular velocity.

22. A method of providing a video display of a selected portion of a panoramic region, the method comprising:

with a lens, focusing light from a field of view onto an array of light sensitive elements, the array of light sensitive elements being defined by a plurality of lines of light sensitive elements;

rotating the lens and light sensitive element array together about an axis of rotation, the array of light sensitive elements being mounted in a plane parallel to the axis of rotation;

monitoring an angular velocity with which the lens and light sensitive element array are rotating about the axis of rotation;

generating clocking signals in accordance with the monitored angular rotation, the clocking signals having a frequency which varies in accordance with the monitored angular rotation and a focal length of the lens;

clocking the array of light sensitive elements with the clocking signal such that lines of data are shifted from each line of light sensitive elements to an adjacent line of light sensitive elements in coordination with the rotating of the lens and the light sensitive element array about the axis of rotation;

storing each line of data from the light sensitive element array as a column of data in a memory which stores the columns of electronic data, which columns of electronic data taken together, represents a most recently collected image of a panoramic view around the axis of rotation;

retrieving a selected portion of rows of the electronic image data from the panoramic memory;

sweeping the selected portion of the electronic image data along the panoramic memory;

converting the retrieved row portions of electronic data into a human-readable display on the monitor.

23. The method as set forth in claim 22 wherein the step of generating clocking signals includes:

generating an angular velocity signal which varies in accordance with the angular velocity of the lens and the array of light sensitive elements about the axis of rotation;

converting the angular velocity signal into a first voltage signal which varies in accordance with the angular velocity of the lens and the light sensitive array around the axis of rotation and in accordance with a focal length of the lens;

converting the first voltage signal into a clocking signal having a frequency corresponding to the first voltage signal.

24. The method as set forth in claim 23 further including:

deriving a second voltage signal from the clocking signal, which second voltage signal varies in accordance with the frequency of the clocking signal;

comparing the second voltage signal with the first voltage signal and adjusting the frequency of the clocking signal in accordance with a deviation therebetween.

25. The method as set forth in claim 22 wherein the retrieving of data from the panoramic memory is performed at a retrieval clocking frequency which is independent of the frequency of the clocking signal used to control the array of light sensitive elements.

* * * * *